United States Patent Office 3,038,882
Patented June 12, 1962

3,038,882
METHOD OF PREPARING CHLORINATED PHENOLIC - FORMALDEHYLE CONDENSATION PRODUCTS
Gilbert Gavlin, Lincolnwood, and William M. Boyer, Park Forest, Ill., assignors to The Richardson Company, Melrose Park, Ill., a corporation of Ohio
No Drawing. Filed Dec. 24, 1956, Ser. No. 630,054
1 Claim. (Cl. 260—59)

This invention relates to new and improved resinous compositions of the novolak type and more particularly to chlorinated novolaks.

Novolaks and their preparation have been known for some time, as is evidenced by numerous references in the available literature. Processes for forming novolaks are, at this date, fairly well standardized and comprise, in general, the reaction of a phenol with an aldehyde in the presence of an acid catalyst with the molar ratio of phenol to aldehyde usually being about 1:1 or slightly higher. Novolaks produced in the foregoing manner are soluble in numerous organic solvents and permanently fusible, and thus, cannot be cured upon subsequent heating. Such resins are to be distinguished from somewhat similar resinous compounds normally referred to as resoles, which are capable of being permanently cured to a hardened condition by continued application of heat. Resoles are, in general, also formed by reacting phenols and aldehydes in desired proportions, but in the presence of a basic catalyst rather than an acid catalyst. It is possible, of course, to cure novolaks to a final hard non-fusible product by adding to the novolak a compound which is methylene-donating, such as hexamethylene tetramine, and subjecting the composition to heat.

Certain limited reports have been published with respect to chlorinated novolaks, however, as far as can be determined, these reports propose to form a chlorinated novolak by starting with a chlorophenol, in particular, para chlorophenol and reacting the same with formaldehyde in the presence of an acid catalyst. While such a process may yield a specific type of chlorinated compound, it has certain inherent disadvantages, and also lacks the flexibility of obtaining resins with desirable branch-chain structures, as well as disadvantages in not being capable of producing highly chlorinated novolaks.

For example, when a novolak is to be made from a phenol which has been chlorinated, such as para chlorophenol, the desired reaction is relatively sluggish and slow, due to the presence of chlorine in the phenol ring or nucleus and, accordingly, relatively high molecular weight products are difficult to achieve. As will be appreciated by those familiar with the art of forming such resins, the presence of an element in the phenol ring such as chlorine has a definite tendency to deactivate the ring relative to reaction with formaldehyde. If it is desired to form a resinous product using a phenol which has more than one chlorine in the ring, it will be found even more difficult to achieve any real degree of polymerization, for the reason that the chlorine will make the phenolic ring highly inactive.

Additionally, to make a partially chlorinated novolak the normal course of action taken would be to initially form a mixture of a chlorinated phenol and a non-chlorinated phenol and react the same with an aldehyde under appropriate conditions, the mixture of chlorinated phenol and non-chlorinated being made in approximately the proportions which would be estimated to give a resultant partially chlorinated novolak desired. However, due to the relative inactive chlorinated phenol in the initial mixture, the tendency would be for the aldehyde to react with all of the non-chlorinated phenol and to only a limited extent with the chlorinated phenol, thereby resulting in a novolak which would not have the desired chlorination.

Accordingly, one of the main objects of this invention is to eliminate the foregoing disadvantages and to provide a new and improved method of preparing chlorinated novolaks.

Another object is to provide a process for obtaining chlorinated novolaks wherein the degree of chlorination can be predetermined and controlled.

A further object is to provide novolak type compounds which have improved compatibility with other substances such as non-polar solvents, resins and rubbers.

A further object is to provide a process for making normally fusible chlorianted resins having branch chains.

A still further object is the provision of chlorinated novolaks which may be reacted with other compounds to produce new products having enhanced properties.

Other objects of the invention and advantages thereof will appear in the more detailed disclosure set forth hereinafter.

The present invention, in one of its aspects, is directed to obtaining a chlorinated novolak wherein the novolak is first formed from a phenol, unmodified by a halogen, and an aldehyde using an acid catalyst, followed by introducing chlorine into the previously prepared novolak. The chlorine, normally as a gas, is preferably introduced under the surface of a solution of the novolak in a solvent for a required period of time and at any one of a number of temperature levels, either above or below zero degrees centigrade. It has been found that chlorine is readily accepted by novolaks and in fact chlorination of a novolak to any desired degree can be easily controlled without using a catalyst. Various temperatures have been employed for chlorination extending from minus 70° C. up to well above room temperature without appreciably affecting the rapidity of the reaction or the acceptability of the chlorine by the novolak.

As is to be expected during the chlorination of a novolak, hydrogen chloride will be formed and, depending on the temperature employed, will usually either be retained in the solution or evolved therefrom as a gas. However, certain solvents tend to retain the hydrogen chloride more readily than others.

Various solvents have been used, in which the novolak is dissolved during the chlorination, such as methanol, acetic acid, chloroform and 1-nitropropane. The latter solvent, that is 1-nitropropane, is preferred, for the reason that it has less affinity for the hydrogen chloride produced and, therefore, permits ready separation of the same from the solution at lower temperatures of reaction. The chlorinated novolak formed when, for example, using a solvent may be isolated by simply stripping the solvent under vacuum or by drowning the reaction mixture in water and separating the resin, the latter process being preferred.

While in some instances it is preferable to chlorinate a novolak in solvent solutions of the aforementioned type, chlorination can also take place when the novolak is merely heated to a fluid condition without a solvent.

In forming a novolak by reacting a phenol and an aldehyde under acid conditions, it can be expected that both straight chain reactions and branch-chain reactions will occur. However, if the phenol ring contains chlorinated positions there will be little opportunity for branch-chain reactions to take place, which for some purposes would be desirable. Thus, chlorinated novolaks can be formed, in accordance with the teachings of the present invention, having a relatively high degree of branch-chain structures which would not be the case if a chlorinated novolak were to be formed from, for example, a para chlorophenol as a starting ingredient.

At this point it is advisable to set forth certain theoretical considerations which are believed involved in the chlorination of novolaks in accordance with the procedures set forth herein, although it is not intended that the invention be necessarily limited by such considerations.

Upon chlorination of a novolak, as indicated above, the chlorine enters the phenol ring or nucleus replacing hydrogen and is thereby added to the ring, at a position either ortho or para, or both, to the hydroxyl group, when such positions are open and depending on the extent of treatment with chlorine. As more and more chlorine enters the molecule, selectivity tends to disappear and the chlorine will be added at almost any available position on the ring. In some instances it has been indicated that chlorine, to a very minor extent, has entered the methylene groups of the resin, but this is quite infrequent. Further, when a chlorine atom is attached to one phenolic ring or nucleus of a novolak resin, a second chlorine atom will not normally attach itself to the same ring until other non-chlorine containing rings have been reacted. Once all of the phenolic rings in the resin molecule contain a chlorine atom, subsequent addition of chlorine will cause other chlorine atoms to enter previously chlorinated rings, where positions are available to them.

In view of the foregoing theories of reaction it has been found, as previously indicated, that the degree of chlorination can be readily controlled and a novolak can be chlorinated to any extent desired by controlling the amount of chlorine introduced into the resin. The chlorination of novolaks does not affect their subsequent reaction with certain modifying agents and such a novolak can, for example, be readily epoxylated by reaction with epichlorohydrin.

Chlorinated novolaks of this invention can be used as casting resins and surface coatings. They also have been found to be readily compatible with a variety of other types of resins, especially hydrocarbon resins, and rubbers such as GRS to form new compositions having improved properties. Laminates having increased flame retardance have been made using a mixture of a chlorinated novolak and a cresylic resole, as well as a chlorinated novolak with a standard phenolic resole.

It has also been discovered that chlorinated novolaks of the type contemplated by this invention have marked fungicidal and bactericidal properties and, hence may be employed with carriers or added to paints for this purpose. The use of chlorinated novolaks as fungicidal agents is more fully disclosed and claimed in the copending application of William M. Boyer, S.N. 674,019, filed July 25, 1957.

While the foregoing disclosure has centered around novolaks produced from unsubstituted phenol, it should be emphasized that alkylated phenols can be used to form the novolaks without encountering certain of the difficulties found with chlorophenols. In fact, certain alkylated phenols enhance the formation of novolaks. Thus, a meta cresol will tend to be more reactive in the formation of a novolak than will normal phenol. Likewise para cresol and 3,5-xylenol may also be used in forming novolaks for subsequent chlorination. Accordingly, when the term "novolak" is used herein its is intended to mean a fusible, organic solvent-soluble condensation product of an aldehyde with a phenol such as normal phenol, meta or para cresol and 3,5-xylenol or mixtures thereof and wherein the condensation reaction is normally performed in the presence of an acid catalyst.

Certain examples are set forth hereinafter for purposes of illustrating the concepts of the invention without intending to thereby limit the same.

*Example 1*

This example illustrates the formation of a typical novolak which may be subsequently chlorinated as described herein.

2070 grams (22 moles) of phenol were melted and poured into a 3 liter resin flask equipped with a glass fabric heating mantle, an internal thermometer, a reflux condenser, a paddle stirrer and a stoppered opening through which solid materials or liquids may be added. Twenty-nine grams of oxalic acid dihydrate were dissolved in 290 grams of ethyl alcohol and this solution was added to the melted phenol. This mixture was stirred and heated to 110° C. Through the stoppered opening five portions of 90.6 grams each of paraform were added in 15 minute intervals. Thus a total of 453.0 grams (13.75 equivalents of 91% active formaldehyde) were added in 60 minutes. After the last addition of paraform the reaction mixture was refluxed gently for two hours during which time the internal temperature fell slowly from 110.5° to 100.8° C. The reflux condenser was removed and arranged for distillation. In 2 hours 7 minutes 595 ml. of distillate were removed and the internal temperature rose to 151° C. The mixture was heated electrically while steam was passed into the stirred mixture. In 5 hours 45 minutes of steam distillation, the internal temperature rose to 164° C. and 9 liters of distillate were collected. Toward the end of steam distillation the distillate was found to be nearly free of phenol. Electrical heating was continued and steam was replaced by a slow stream of carbon dioxide to remove small amounts of water. In the next hour and 45 minutes the temperature in the resin kettle rose to 183° C. The yield of finished novolak was 1830 grams.

*Example II*

The following procedure was employed to produce a chlorinated novolak resulting in an addition of chlorine to the resin in an amount equal to about one chlorine atom per phenolic ring.

Eight hundred and forty-eight grams of a phenol formaldehyde novolak were ground up in a mortar. The ground novolak was placed in a 5 liter four necked flask fitted with a paddle stirrer, then 858 grams of 1-nitropropane was added and the novolak dissolved by slow stirring overnight. A few small pieces of resin remained so that 100 grams more 1-nitropropane was added in the morning. An internal thermometer, a reflux condenser and a fritted glass gas inlet tube were added to the flask and the mixture was heated to 49° C. on a steam bath. Chlorine from a weighed cylinder was then introduced through the gas inlet tube into the rapidly stirred mixture and in 7 hours a total of 605 grams (8.5 moles) of chlorine gas was passed into the resin solution. During the chlorination the temperature ranged from 47° to 62° but was close to 50° most of the time. The mixture was stirred slowly overnight and then drowned by pouring into five gallons of vigorously stirred cool water. The resin was allowed to settle and then washed with three five gallon portions of cool water. After separation of the third wash water, the cherry red resin was dissolved in 3 liters of methyl ethyl ketone by vigorous stirring. This solution was transferred to a large separatory funnel, one more liter of methyl ethyl ketone was added and the water layer drawn off. The solvent was removed from the filtered resin by vacuum stripping at 45° to 60° with a water aspirator and finally at 105° C. with a high vacuum pump.

The yield of resin was 1035 grams. Analysis showed 23.66 percent by weight chlorine, 0.287 percent by weight chlorine reactive with silver nitrate at 150° F., 0.85 percent by weight volatiles and 0.3 percent by weight water.

*Example III*

This example illustrates the production of a chlorinated resin having approximately two chlorine atoms per phenol ring. One thousand and sixty grams of a phenol formaldehyde novolak were ground in a mortar. Using the same apparatus as described in Example II, the resin was dissolved in 1615 grams of 1-nitropropane. Chlorination was carried out in 12 hours 30 minutes (2 hours first day, 8 hours second day and 2½ hours the third day) at temperatures of 26° to 68° but mostly near 45° C. In this time a total of 1400 grams (19.7 moles) of chlorine gas was run into the resin solution. The resin was drowned in water, washed, dissolved in methylethyl ketone, filtered and stripped of solvent essentially as described previously, except that a higher temperature, 170° C. was used in the final stripping.

The yield of resin was 1940 grams. Analysis showed 38.03 percent by weight chlorine, 3.57 percent by weight chlorine reactive with silver nitrate at 150° F., 5.34 percent by weight voltaties and 0.30 percent by weight water.

*Example IV*

Two hundred and twelve grams of a phenol formaldehyde novolak were dissolved in 800 ml. of methanol in a three liter four necked flask fitted with an internal thermometer, a fritted glass gas inlet tube, a paddle stirrer and a reflux condenser. When solution was complete, the resin solution was cooled to minus 66° C. in a Dowanol 33B-Dry Ice bath and chlorine was led through the fritted glass inlet tube from a weighed cylinder. In 3 hours and 42 minutes at minus 63° to minus 68°, 284 grams (4 moles) of chlorine gas were passed into the mixture. No hydrogen chloride was evolved from the mixture until after chlorination when the solution was allowed to warm up to 5° C. The reaction mixture was drowned in 6 liters of cold water by pouring a thin stream of the reaction mixture into the vigorously agitated water. The precipitated resin was washed with cold water six times and the resin separated by decantation. The solid resin was filtered off and oven dried at 80° C. The yield of resin was 307 grams. Analysis showed 40.15 percent by weight chlorine, 5.17 percent by weight volatiles and 0.6 percent by weight water.

*Example V*

Six hundred thirty-six grams of a phenol-formaldehyde novolak were dissolved in 424 grams of methanol. The resin was dissolved in the methanol in the usual 5 liter chlorination apparatus by gentle warming. The flask was then cooled in a running water bath, and in three hours 37 minutes at 9 to 15° C. a total of 213 grams (3 moles) of chlorine gas was led into the mixture. After chlorine addition was completed to the desired level, the reaction mixture was stripped of solvent and hydrogen chloride by heating under aspirator vacuum to a final temperature of 170° C. Seven hundred twenty-nine grams of resin were obtained which showed by analysis to contain 13.80 percent by weight chlorine and 3.19 percent by weight volatiles.

*Example VI*

Two hundred and twelve grams of a phenol-formaldehyde novolak of the type prepared in Example I was dissolved in 1415 ml. of chloroform in the usual 5 liter chlorination apparatus by stirring and gentle warming overnight. Chlorine gas was led into the mixture for 6½ hours at 45° to 62° C. When 285 grams (4 moles) of chlorine had been run in, the chlorine gas was shut off. During this reaction, some hydrogen chloride was observed escaping from the exit of the reflux condenser. The chloroform solution was washed with ten equal volumes of cold water in a separatory funnel, the chloroform layer drawn off, filtered and the solvent removed under the water pump. Finally, the high vacuum pump was employed to remove the last traces of solvent, using a maximum temperature of 78° C. 342 grams of resin was obtained, analyzing 43.3 percent by weight chlorine, 5.67 percent by weight chlorine reactive with silver nitrate at 150° F., 6.54 percent by weight volatiles and 0.25 percent by weight water.

As previously indicated, the chlorinated novolaks of this invention may be subjected to reaction with many curing and modifying agents to give an end product having desired properties. Thus, they can be cured by reacting with hexamethylene tetramine or modified by reacting with epichlorohydrin. An example of an epoxylation of a chlorinated novolak is as follows:

*Example VII*

Six hundred thirty two grams of chlorinated novolak (containing 35.58 percent by weight chlorine) were dissolved in a mixture of 740 grams (8 moles) of epichlorohydrin and 500 ml. of ethyl alcohol in a 5 liter four necked flask fitted with a heating mantle, a paddle stirrer, an internal thermometer, a reflux condenser and an addition funnel. A solution of 160 grams (4 moles) of sodium hydroxide in 207 ml. of water was prepared and placed in the addition funnel. The resin solution was heated to 63° C. and slow addition of the sodium hydroxide solution was begun. Eighty-three minutes were required to add all of the sodium hydroxide solution and occasional immersion of the flask in water was necessary to moderate the reaction. The internal temperature remained at 75 to 82° during the reaction and was accompanied by vigorous refluxing. In fifteen minutes the addition of sodium hydroxide was completed and the reaction considered finished. Three liters of warm distilled water were added and stirred well. The resin was allowed to separate and the water was sucked out. This washing was repeated again. After removal of the second wash water, 2 liters of methyl ethyl ketone were used to dissolve the resin. Water was separated from this solution. It was filtered and the solvent removed under water pump vacuum to a final resin temperature of 147° C. The yield of resin was 840 grams. Analysis showed that this resin contained 0.342 mole of epoxy groups per 100 grams of resin, 25.43 percent by weight chlorine and 8.80 percent by weight volatiles.

Having disclosed and described the invention and certain exemplary embodiments therefor, it is intended that the same be limited only by the scope of the following claim.

We claim:

A method of preparing a chlorinated resinous composition of matter which comprises the steps of dissolving in 1-nitropropane a permanently fusible acid-catalyzed resinous condensation product of formaldehyde and a chlorine-free member of the class consisting of phenols, cresols, and xylenols, and introducing chlorine gas into the solution in an amount which will permit that minimum addition of chlorine to said condensation product which is equivalent to at least one chlorine atom for at least one phenolic nucleus, said chlorination being conducted at a temperature which is sufficient to permit simultaneous evolution from the solution of the gaseous hydrogen chloride formed as a by-product.

References Cited in the file of this patent

UNITED STATES PATENTS

| | | |
|---|---|---|
| 2,027,988 | Landt | Jan. 14, 1936 |
| 2,475,587 | Bender et al. | July 12, 1949 |
| 2,658,884 | D'Alelio | Nov. 10, 1953 |

FOREIGN PATENTS

| | | |
|---|---|---|
| 429,377 | Italy | Jan. 24, 1948 |

OTHER REFERENCES

Bakeland: Jour. of Industrial Engineering Chemistry. March 1909, page 155.

Carswell: "Phenoplasts" High Polymer Series, vol. VII; Interscience Publishers, N.Y. (1947), pages 9 and 35. (Copy in Div. 60.)